(12) United States Patent
Zelman

(10) Patent No.: US 6,942,337 B2
(45) Date of Patent: Sep. 13, 2005

(54) EYEWEAR HAVING BOTH A PRIMARY LENS FRAME AND AN AUXILIARY LENS FRAME SEPARATELY COUPLED TO AN EYEWEAR PLATFORM

(76) Inventor: Gary M. Zelman, 997 Plower Glen Rd., Simi Valley, CA (US) 93065

( * ) Notice: Subject to any disclaimer, the term of this patent is extended or adjusted under 35 U.S.C. 154(b) by 163 days.

(21) Appl. No.: 10/665,400

(22) Filed: Sep. 20, 2003

(65) Prior Publication Data

US 2005/0151923 A1    Jul. 14, 2005

Related U.S. Application Data

(63) Continuation-in-part of application No. 10/112,970, filed on Mar. 27, 2002, now Pat. No. 6,786,593, which is a continuation-in-part of application No. 10/055,466, filed on Jan. 22, 2002, now abandoned, which is a continuation-in-part of application No. 10/035,296, filed on Nov. 8, 2001, now Pat. No. 6,585,370.

(51) Int. Cl.[7] .............................................. G02C 9/00
(52) U.S. Cl. ........................... 351/47; 351/57; 351/106
(58) Field of Search ..................... 351/47, 57, 103–109

(56) References Cited

U.S. PATENT DOCUMENTS 6,585,370 B2 *   7/2003   Zelman ...................... 351/103
6,742,888 B1 *   6/2004   Kim ............................. 351/47

* cited by examiner

*Primary Examiner*—Huy Mai
(74) *Attorney, Agent, or Firm*—Trojan Law Office

(57) ABSTRACT

Eyewear comprising an eyewear platform having a bridge portion and a pair of temple extensions, each temple extension located at an opposite end of said bridge portion and having a socket extending therefrom with a magnetic member disposed within said socket, a primary lens frame having a pair of primary lenses and a pair of primary magnetic members, wherein each primary magnetic member magnetically couples to a corresponding magnetic member in one of the sockets of the eyewear platform from the top, thereby securing the primary lens frame to the eyewear platform; and an auxiliary lens frame having a pair auxiliary lenses and a pair of auxiliary magnetic members, wherein each auxiliary magnetic member magnetically couples to a corresponding magnetic member in one of the sockets of the eyewear platform from the bottom, thereby securing the auxiliary lens frame to the eyewear platform such that the auxiliary lenses are disposed in front of the primary lenses.

13 Claims, 6 Drawing Sheets

EYEWEAR HAVING BOTH A PRIMARY LENS FRAME AND AN AUXILIARY LENS FRAME SEPARATELY COUPLED TO AN EYEWEAR PLATFORM

PRIORITY CLAIM

This is a continuation-in-part application of U.S. Ser. No. 10/112,970 filed on Mar. 27, 2002, now U.S. Pat. No. 6,786,593 which is a continuation-in-part of U.S. Ser. No. 10/055,466, filed Jan. 22, 2002, now abandoned, which is a continuation-in-part of U.S. Ser. No. 10/035,296, which was filed on Nov. 8, 2001, now U.S. Pat. No. 6,585,370.

FIELD OF THE INVENTION

This invention relates to eyewear and eyeglasses. More particularly, the present invention relates to a method and apparatus wherein a primary lens frame having a pair of primary lenses and an auxiliary lens frame having a pair of auxiliary lenses are both removeably coupled to an eyewear platform using magnetic members or other attachment devices. By allowing removable attachment of both the primary and auxiliary lens frames, the user will be able to maximize his or her ability to change shapes, styles, colors, and prescription strengths of both the primary and/or the auxiliary lenses depending on the need and/or situation.

DESCRIPTION OF THE PRIOR ART

Auxiliary eyewear attachments, which connect to a primary lens frame (more commonly referred to as a conventional set of eyeglasses) through the use of magnetic members and/or clips, are well known in the art. Such auxiliary eyewear attachments may allow a user to convert the conventional set of eyeglasses into sunglasses while avoiding the need for an additional pair of prescription sunglasses. These auxiliary eyewear attachments can also be used to enhance the prescription of the lenses in the primary lens frame.

Many current designs exist for coupling auxiliary eyewear attachments to a primary lens frame. Such designs include the use of magnetic members, fasteners, pin/socket assemblies and/or clips. These may be positioned at various locations on either or both the primary and/or auxiliary lens frame.

However, there are several limitations to mounting an auxiliary lens frame to a primary lens frame using conventional methods and techniques. One major disadvantage is the fact that the auxiliary lenses in the auxiliary lens frame must basically conform to the shape and size of the primary lenses in the primary lens frame. Accordingly, the ability to interchange various auxiliary lenses is somewhat limited. Additionally, some users may have different prescriptions for different activities. For example, a user may have one prescription (nearsighted) for driving and another for reading (farsighted). Accordingly, he or she may then need to buy two different pairs of primary lens frames and two different corresponding pairs of auxiliary lens frames depending upon the situation.

Therefore, what is needed is eyewear that provides both an auxiliary lens frame having auxiliary lenses and a primary lens frame having primary lenses which allows a user to easily swap out either lens frame in order to maximize flexibility and versatility.

SUMMARY OF THE INVENTION

The claimed invention avoids the above referenced limitations and provides significant advantages with a new apparatus and method for attaching both a removable primary lens frame and a removeable auxiliary lens frame to an eyewear platform. In the applicant's invention, both the primary and auxiliary lens frame are removably coupled to an eyewear platform so that the user can easily swap out either the primary lenses or the auxiliary lenses, or both, quickly and easily. Thus the user can change not only the auxiliary lenses but also the prescription or primary lenses at any time. Accordingly, the user is able to employ one eyewear apparatus that allows for multiple and different types of lenses and that can be changed easily and quickly. This instant eyewear apparatus is also comfortable to wear and easy to use. Keeping a small case with different types of lenses is easier to transport than several boxes of different eyewear. Finally, instead of having to own several different pairs of both conventional eyeglasses and prescription sunglasses, each possibly having a different prescription, the user may have substantial savings in cost by merely having different sets of primary and auxiliary lenses which may then be easily attached to and/or removed from a single, stable eyewear platform.

This invention allows the user to maximize the different kinds of eyewear available according to his or her need. For example, the user can easily change the primary lens frame from prescription lenses for driving to reading lenses for fine print while using the same auxiliary lens frame. Also, the user can change the color of their sunglasses depending on their particular need or situation by simply switching to a new auxiliary lens frame. For example, the user may require yellow lenses for driving in the mountains, but gray lenses for fishing or boating on a bright sunny day.

In addition to allowing for more flexibility and versatility in swapping out both the primary and/or the auxiliary lens frame, the present invention provides a quick and easy, yet stable and effective means for attaching both to a secure and stable eyewear platform. Preferably, the eyewear platform is configured to provide effective strength and resistance in coupling both the primary and auxiliary lens frames, thereby preventing either the primary or the auxiliary lens frame from becoming involuntarily detached from the eyewear platform.

In a first preferred embodiment of the invention, the eyewear platform includes a first pair of magnetic members disposed near the temples of the eyewear platform. The primary lens frame is coupled to the eyewear platform via a pair of primary magnetic members disposed on the primary lens frame near the temples of the primary lens frame and designed to engage the first pair of magnetic members of the eyewear platform. Preferably, each of the primary magnetic members in the primary lens frame engage the first pair of magnetic members in the eyewear platform from the top. Alternatively, they may engage the first pair of magnetic members in the eyewear platform from the bottom.

In this same first preferred embodiment, the auxiliary lens frame is coupled to the eyewear platform through the use of a pair auxiliary magnetic members disposed on the auxiliary lens frame near the temples of the auxiliary lens frame and also designed to engage the first pair of magnetic members of the eyewear platform. Preferably, each of the auxiliary magnetic members in the auxiliary lens frame engage the first pair of magnetic members of the eyewear platform from the bottom. Alternatively, they may engage the first pair of magnetic members in the eyewear platform from the top.

In alternate preferred embodiments of the invention, either the primary lens frame or the auxiliary lens frame, or both, may be coupled to the eyewear platform through the use of non-magnetic attachments such as pins, clasps, or the clips.

In its preferred embodiments, the present invention has several aspects or facets that can be used independently and/or in different combination, although they are preferably employed together to optimize their benefits. All of the foregoing operational principles and advantages of the present invention will be more fully appreciated upon consideration of the following detailed description, with reference to the appended drawings.

DETAILED DESCRIPTION OF THE PREFERRED EMBODIMENTS

Figure 1:
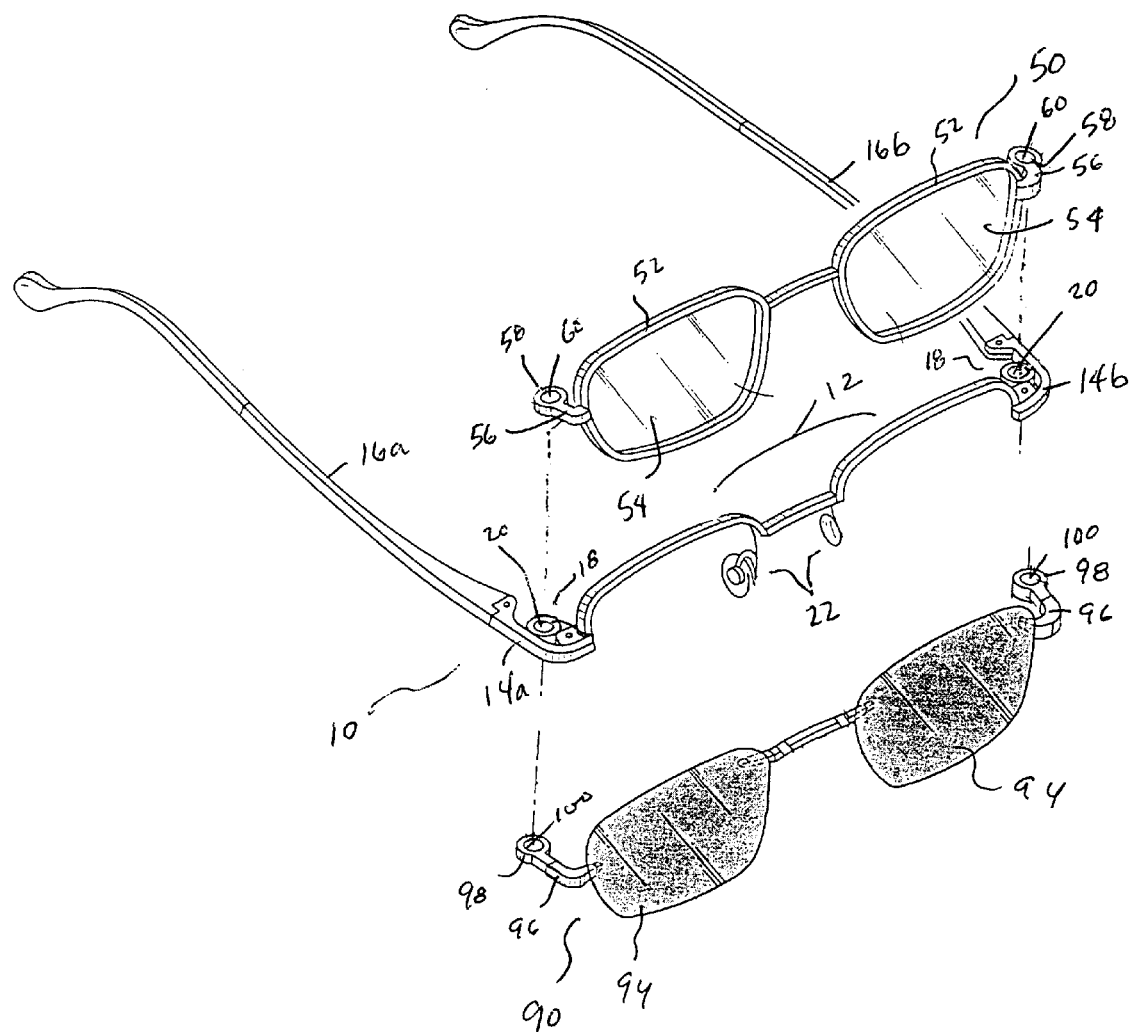
FIG. 1 shows an exploded view of a first preferred embodiment of the present invention including a primary lens frame, an auxiliary lens frame, and an eyewear platform, where the primary lens frame is coupled to the eyewear platform from the top and the auxiliary lens frame is coupled to the eyewear platform from the bottom.

Referring to FIG. 1, there is shown an exploded view of a first preferred embodiment of the present invention including an eyewear platform 10, a primary lens frame 50, and an auxiliary lens frame 90. As shown, the eyewear platform 10 includes a bridge portion 12 and two temple extensions 14a–b, located at opposite ends of the bridge portion. A set of arms 16a–b is pivotally coupled to the eyewear platform 10, one at each temple extension. The arms 16a–b can be adjustably connected to the platform 10 through a variety of different adjustable connections such as a spring, a hinge, or a joint can be used. The arms 16a–b are capable of being placed over a user's ears with the bridge portion 12 resting on a user's nose to permit the eyewear platform 10 to be worn by a user.

The temple extensions 14a–b are located at the ends of the bridge portion 12. Each temple extension further includes a socket 18 which preferably extends rearwardly therefrom, for coupling both the primary lens frame 50 and the auxiliary lens frame to the eyewear platform 10. In the first preferred embodiment, the socket 18 is preferably round in shape and having a magnetic member 20 securely disposed therein. Although, the socket 18 is illustrated as being circular in shape, it is understood that the socket need not be circular in shape and, moreover, the magnetic members 20 need not be completely surrounded by the socket 18. It is sufficient so long as each magnetic member 20 is securely disposed within its respective socket and not removeable.

Each magnetic member 20 is preferably situated within its respective socket 18 such that both the top surface and the bottom surface of the magnetic member are exposed on opposite sides of the socket 18. In a first preferred embodiment, the top surfaces of magnetic members 18 are utilized for coupling the primary lens frame 50 to the eyewear platform from the top and the bottom surfaces of the magnetic members 18 are utilized for coupling the auxiliary lens frame 90 to the eyewear platform 10.

The eyewear platform 10 also includes a pair of nose pads 22 preferably coupled at a midpoint of the bridge 12 on the eyewear platform 10. The shape and size of the eyewear platform 10 may vary depending upon the material used to comprise the platform, e.g. metal or plastic, and the arms and nose pads may also be comprised of a like or different material—i.e. the nose pads may be cushioned or formed of a more pliable plastic while the platform 10 itself may be made of metal.

As further illustrated in FIG. 1, a first preferred embodiment of the present invention includes a primary lens frame 50 preferably comprised of a pair of lens holders 52 which each containing a primary lens 54. Although the lens holders illustrated in FIG. 1 are shown as completely encircling and encompassing each lens 54, it understood that various embodiments may exist wherein the entire lens may be encompassed and contained or only a portion of the lens may be contained within the lens holder 52.

At the opposing terminal ends of the primary lens frame 50 are primary frame extensions 56. Each of the primary frame extensions preferably curve and bend to align with the temple extensions 14a–b of the eyewear platform 10. Each primary frame extension 56 further comprises an extension socket 58; with each extension socket 58 positioned such that it will align with a corresponding socket 18 in the eyewear platform 10 when the primary lens frame is coupled to the eyewear platform 10.

Each extension socket 58 in the primary lens frame 50 preferably houses a magnetic member 60. This magnetic member 60 can be situated in a variety of different positions within the extension socket 58, depending upon how the magnetic member 20 in the socket 18 of the temple extensions 14a–b are positioned.

As shown in FIG. 1, the primary lens frame 50 is preferably designed to coupled to the eyewear platform from the top and the rear. In this way the lenses in the primary lens frame extend from just behind the eyewear platform. The shape and size of the primary lens frame 50 may vary depending upon shape and size of the eyewear platform 10 and the material used to comprise the primary lens frame 50 may be the same as or different from the material used to comprise the eyewear platform.

As further illustrated in FIG. 1, a first preferred embodiment of the present invention includes an auxiliary lens frame 90 preferably comprised of a pair of auxiliary lens holders 92, each containing an auxiliary lens 94. Although the auxiliary lens holders illustrated in FIG. 1 are shown as completely encircling and encompassing each auxiliary lens 94, it is understood that various embodiments may exist wherein the entire lens may be encompassed and contained or only a portion of the lens may be contained within the lens holder 92 or in which there are no lens holders at all and only auxiliary lenses 94.

At opposing ends of the auxiliary lens frame 90 are auxiliary frame extensions 96. Each of the auxiliary frame extensions preferably curve and bend to align with the temple extensions 14a–b of the eyewear platform 10. Each auxiliary frame extension 96 further comprises an auxiliary socket 98; with each auxiliary socket 98 positioned such that it will align with a corresponding socket 18 in the eyewear platform 10 when the auxiliary lens frame is coupled to the eyewear platform 10.

Each auxiliary socket 98 in the auxiliary lens frame 90 preferably houses a magnetic member 100. These magnetic members 100 can be situated in a variety of different positions within the auxiliary socket 98, depending upon how the magnetic members 20 in the sockets 18 of the temple extensions 14a–b are positioned.

As shown in FIG. 1, the auxiliary lens frame 90 is preferably designed to couple to the eyewear platform from the bottom and the front. In this way the lenses in the auxiliary lens frame extend just in front of the both the primary lenses and the eyewear platform. The shape and size of the auxiliary lens frame 90 may vary depending upon shape and size of both the eyewear platform 10 and primary lens frame 50. The material used to comprise the auxiliary lens frame 90 may be the same as or different from the material used to comprise the eyewear platform 10 and/or the primary lens frame 50.

Figure 2A:
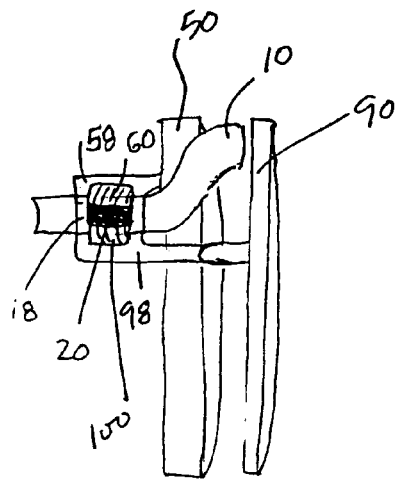
FIGS. 2a–c show various close-up cross-sectional side views of the first preferred embodiment of the present invention in order to further demonstrate the coupling of the primary lens frame and the auxiliary lens frame to the eyewear platform.
Figure 2B:
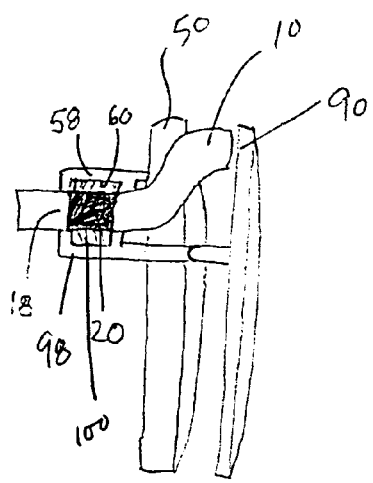
Figure 2C:
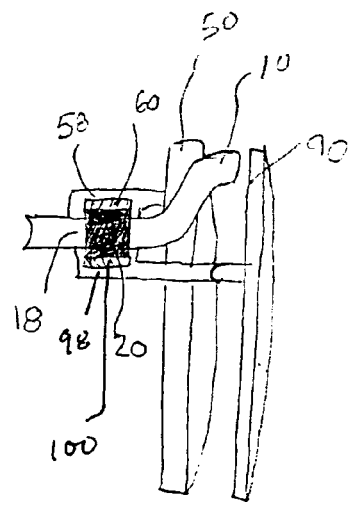

Referring to FIGS. 2a–c, there is shown various cross-sectional side views of the first preferred embodiment of the present invention in order to further demonstrate the coupling of the primary lens frame and the auxiliary lens frame to the eyewear platform. As shown in FIG. 2a, magnetic member 20 may be disposed within socket 18 such that it is recessed within the socket, thereby forming recesses at the top and bottom of the socket 18. Alternatively, and as further illustrated in FIG. 2b, the magnetic member 20 may lie flush within the socket 18 such that no recesses are formed. Finally, as show in FIG. 2c, magnetic member 20 may be positioned within the socket 18 such that the top and bottom surfaces of the magnetic member extend above and below the socket 18, thereby creating an elevated mounting surface above and below the socket 18.

As explained earlier, magnetic member 60 may be situated in a variety of different positions within the extension socket 58 of the primary lens frame 50, depending upon how the magnetic member 20 is positioned within socket 18 of the eyewear platform 10. For example, as illustrated in FIG. 2a, if the magnetic member 20 is recessed within socket 18 such that a recess is formed at the top of socket 18, then magnetic member 60 is situated within the extension socket 58 of the primary lens frame 50 such that it extends outward in order to fit within the recess and magnetically couple with magnetic member 20 when the primary lens frame 50 is coupled to the eyewear platform 10. Alternatively, and referring to FIG. 2b, if magnetic member 20 is disposed within socket 18 such that it is flush with socket 18, then magnetic member 60 is situated within extension socket 58 of the primary lens frame 50 such that it is also flush within the extension socket 58 such that magnetic member 60 will magnetically couple with magnetic member 20 in a flush fashion when the primary lens frame 50 is coupled to the eyewear platform 10. Finally, referring to FIG. 2c, if magnetic member 20 is positioned within socket 18 of the eyewear platform 10 such that a top surface of the magnetic member extends above the socket 18, thereby creating an elevated mounting surface, then magnetic member 60 is recessed within the extension socket 58 of the primary lens frame 50, thereby forming a recess such that magnetic member 20 will fit within the recess and magnetically couple with magnetic member 60 when the primary lens frame 50 is coupled to the eyewear platform 10.

Finally, as explained earlier, magnetic member 100 may be situated in a variety of different positions within the auxiliary socket 98 of the auxiliary lens frame 90. Referring again to FIG. 2a, if magnetic members 20 are recessed within sockets 18 such that recesses are formed at the bottom of each socket 18, then each magnetic member 100 is situated within its respective auxiliary socket 98 of the auxiliary lens frame 90 such that it extends outward and will fit within the recess formed at the bottom of socket 18 in order to magnetically couple with magnetic member 20 when the auxiliary lens frame 90 is coupled to the eyewear platform 10. Alternatively, and referring to FIG. 2b, if the magnetic members 20 are disposed within sockets 18 such that they are flush within the sockets, then magnetic members 100 are also situated within the auxiliary sockets 98 of the auxiliary lens frame 90 such that they are also flush within the sockets 98, thereby allowing magnetic members 100 to mate with magnetic members 20 in a flush fashion when the auxiliary lens frame 90 is coupled to the eyewear platform 10.

Finally, referring to FIG. 2c, if each magnetic member 20 is positioned within its respective socket 18 of the eyewear platform 10 such that a bottom surface of the magnetic member extends below the socket 18, thereby creating an elevated mounting surface below the socket 18, then magnetic members 100 are each situated within their respective auxiliary sockets 98 of the auxiliary lens frame 90 such that they form recesses within the auxiliary sockets 98 so that magnetic members 20 fit within the recesses and magnetically couple with magnetic members 100 when the auxiliary lens frame 90 is coupled to the eyewear platform 10.

Figure 3:
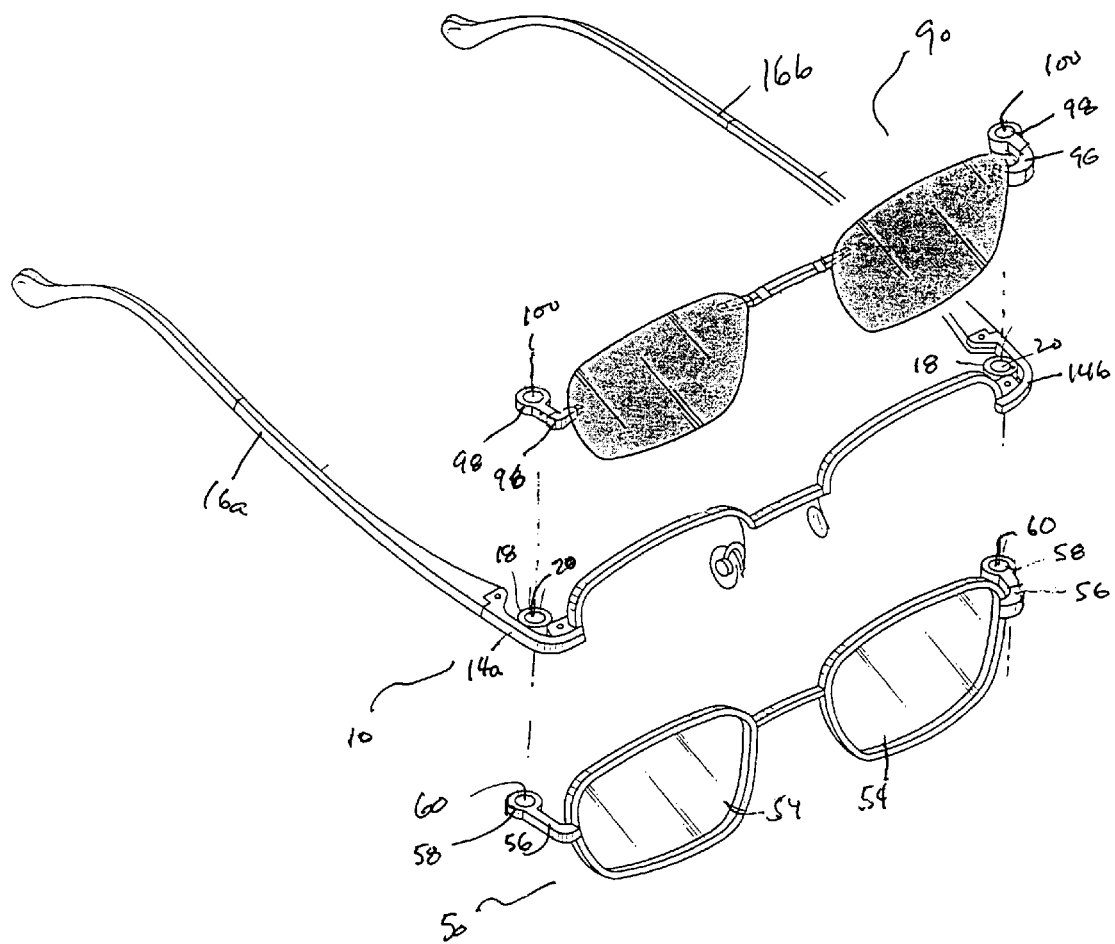
FIG. 3 shows an exploded view of a second preferred embodiment of the present invention including a primary lens frame, an auxiliary lens frame, and an eyewear platform, where the primary lens frame is coupled to the eyewear platform from the bottom and the auxiliary lens frame is coupled to the eyewear platform from the top.

FIG. 3 shows an exploded view of a second preferred embodiment of the present invention including a primary lens frame, an auxiliary lens frame, and an eyewear platform, where the primary lens frame is coupled to the eyewear platform from the bottom and the auxiliary lens frame is coupled to the eyewear platform from the top. The structure of the eyewear platform 10, the primary lens frame 50 and the auxiliary lens frame 90 is the same as that described with reference to FIG. 1 except that the primary magnetic members 60 in the primary lens frame 50 are oriented to engage and magnetically couple with the first pair of magnetic members 20 in the eyewear platform 10 from the bottom and the auxiliary magnetic members 100 in the auxiliary lens frame 90 are oriented to engage and magnetically couple with the first pair of magnetic members in the eyewear platform from the top.

Figure 4A:
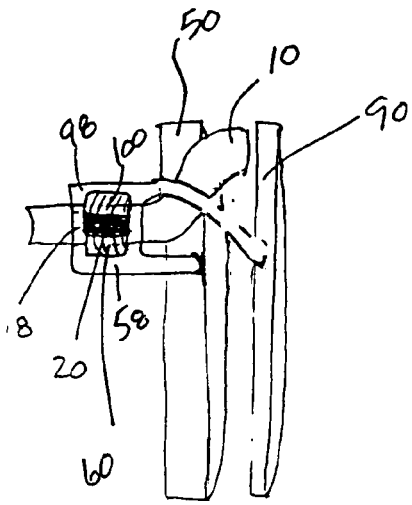
FIGS. 4a–c shows a side view of the second preferred embodiment of the present invention in order to further demonstrate the coupling of the primary lens frame and the auxiliary lens frame to the eyewear platform.
Figure 4B:
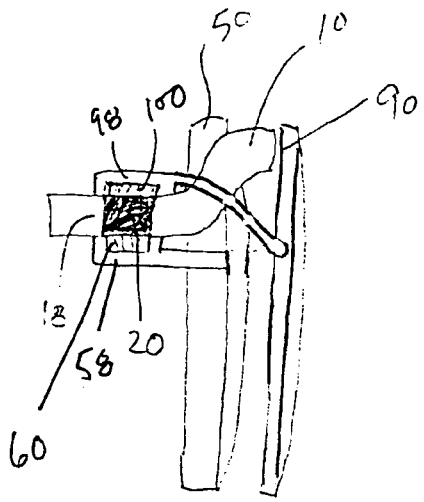
Figure 4C:
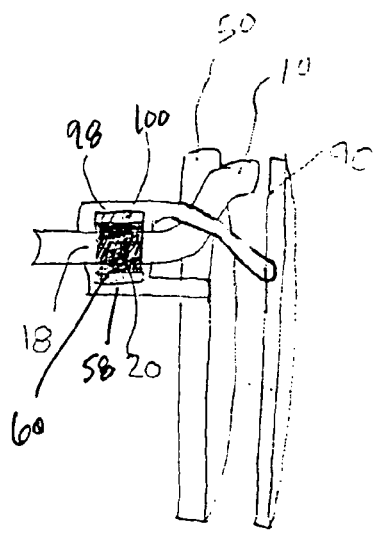

FIGS. 4a–c illustrate cross-sectional side views of the second preferred embodiment of the present invention in order to further demonstrate the coupling of the primary lens frame and the auxiliary lens frame to the eyewear platform.

As shown in FIG. 4a, magnetic member 20 may be disposed within socket 18 of the eyewear platform such that it is recessed within the socket, thereby forming recesses at the top and bottom of the socket 18. Alternatively, and as further illustrated in FIG. 4b, the magnetic member 20 may lie flush within the socket 18 of the eyewear platform such that no recesses are formed. Finally, as show in FIG. 4c, magnetic member 20 may be positioned within the socket 18 of the eyewear platform such that the top and bottom surfaces of the magnetic member extend above and below the socket 18, thereby creating an elevated mounting surface above and below the socket 18.

As explained earlier, in the second preferred embodiment the structure of the primary lens frame 50 is nearly identical to that set forth with reference to the first preferred embodiment as described in FIG. 1 except that the primary magnetic members 60 in the primary lens frame 50 couple to magnetic members 20 in the eyewear platform from the bottom. As discussed with reference to the first preferred embodiment, the primary magnetic members 60 may be situated in a variety of different positions within the extension socket 58 of the primary lens frame 50, depending upon how the magnetic member 20 is positioned within socket 18 of the eyewear platform 10.

For example, as illustrated in FIG. 4a, if the magnetic members 20 of the eyewear platform 10 are recessed within the sockets 18 of the eyewear platform, such that recess is formed at the bottom of each socket 18, then primary magnetic members 60 in the primary lens frame are situated within the extension socket 58 of the primary lens frame 50 such that they each extend outward and upward in order to fit within the recess and magnetically couple with magnetic member 20 when the primary lens frame 50 is coupled to the eyewear platform 10 from the bottom.

Alternatively, and referring to FIG. 4b, if magnetic member 20 is disposed within socket 18 such that it is flush with socket 18, then magnetic member 60 is situated within extension socket 58 of the primary lens frame 50 such that it is also flush within the extension socket 58 such that magnetic member 60 will magnetically couple with magnetic member 20 in a flush fashion when the primary lens frame 50 is coupled to the eyewear platform 10.

Referring to FIG. 4c, if magnetic member 20 is positioned within socket 18 of the eyewear platform 10 such that a top surface of the magnetic member 20 extends below the socket 18, thereby creating an elevated mounting surface, then magnetic member 60 is recessed within the extension socket 58 of the primary lens frame 50, thereby forming a recess such that magnetic member 20 will fit within the recess and magnetically couple with magnetic member 60 when the primary lens frame 50 is coupled to the eyewear platform 10.

Finally, as explained earlier, magnetic member 100 may be situated in a variety of different positions within the auxiliary socket 98 of the auxiliary lens frame 90. Referring again to FIG. 4a, if magnetic members 20 are recessed within sockets 18 such that recesses are formed at the top of each socket 18, then each magnetic member 100 is situated within its respective auxiliary socket 98 of the auxiliary lens frame 90 such that it extends outward and will fit within the recess formed in socket 18 in order to magnetically couple with magnetic member 20 when the auxiliary lens frame 90 is coupled to the eyewear platform 10.

Alternatively, and referring to FIG. 4b, if the magnetic members 20 are disposed within sockets 18 such that they are flush within the sockets, then magnetic members 100 are also situated within the auxiliary sockets 98 of the auxiliary lens frame 90 such that they are also flush within the sockets 98, thereby allowing magnetic members 100 to mate with magnetic members 20 in a flush fashion when the auxiliary lens frame 90 is coupled to the eyewear platform 10.

Finally, referring to FIG. 4c, if each magnetic member 20 is positioned within its respective socket 18 of the eyewear platform 10 such that a top surface of the magnetic member extends above the socket 18, thereby creating an elevated mounting surface, then magnetic members 100 are each situated within their respective auxiliary sockets 98 of the auxiliary lens frame 90 such that they form recesses within the auxiliary sockets 98 so that magnetic members 20 fit within the recesses and magnetically couple with magnetic members 100 when the auxiliary lens frame 90 is coupled to the eyewear platform 10.

Figure 5:
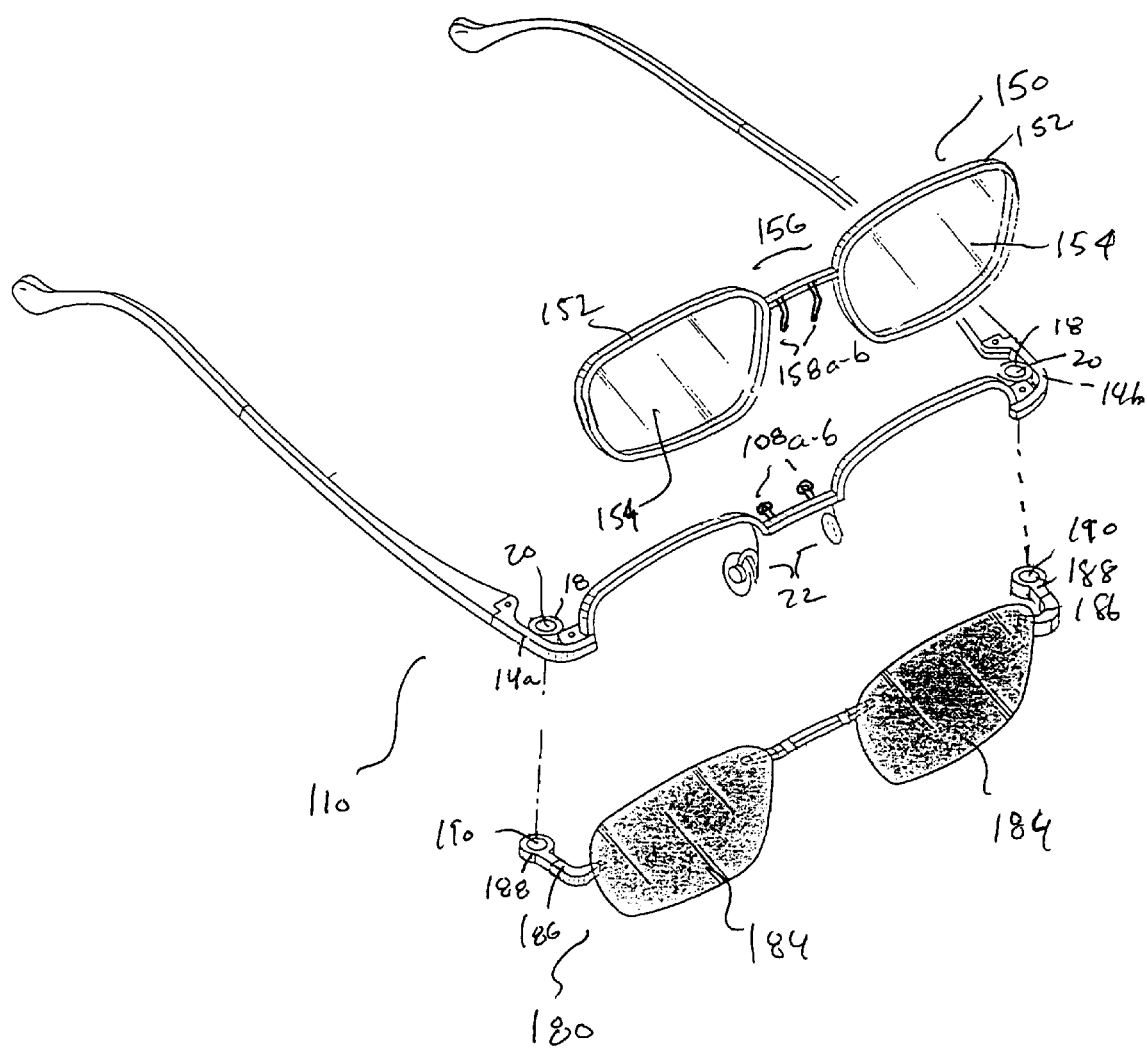
FIG. 5 shows an exploded view of an alternative embodiment of the invention where the primary lens frame couples to the eyewear platform from the top via a pair of mated pin/sockets located near the bridge and the auxiliary lens frame couples to the eyewear platform from the bottom via magnetic members located near the temples.

FIG. 5 shows an exploded view of an alternative embodiment of the invention. As shown in FIG. 5, this alternative embodiment includes an eyewear platform 110, a primary lens frame 150, and an auxiliary lens frame 180. As further shown, in this alternate embodiment, the primary lens frame couples to the eyewear platform from the top via a pair of mated pin/sockets located near the bridges of the primary lens frame 150 and the eyewear platform 110, and the auxiliary lens frame 180 couples to the eyewear platform 110 from the bottom via magnetic members located near the temples. This arrangement is described more fully hereinafter.

Referring to FIG. 5, the eyewear platform 110 is identical to the eyewear platform described with reference to the preferred embodiments, except that the eyewear platform 100 further includes a pair of mounting sockets 108a–b positioned on the bridge portion 12 of the eyewear platform 110. The mounting sockets 108a–b extend rearward, behind the bridge 12 of the platform, and are designed for engaging and mounting the primary lens frame 150 to the platform.

As further illustrated in FIG. 5, the alternative embodiment includes a primary lens frame 150 preferably comprised of a pair of lens holders 152, each containing a primary lens 154. Although the lens holders illustrated in FIG. 5 are shown as completely encircling and encompassing each lens 154, it understood that various embodiments may exist wherein the entire lens may be encompassed and contained or only a portion of the lens may be contained within the lens holder 152.

As further shown in FIG. 5, the primary lens frame 150 includes a bridge portion 156. This bridge portion preferably includes two separate pin extensions 158a–b which extend forward and downward from the primary lens frame 150. Each pin extension is designed to engage a corresponding socket 108a–b in eyewear platform 110 such that the primary lens frame 150 couples with and mounts to the eyewear platform 110 from the rear of the platform.

As further illustrated in FIG. 5, this alternative embodiment includes an auxiliary lens frame 180 preferably comprised of a pair of auxiliary lens holders 182, each containing an auxiliary lens 184. Although the auxiliary lens holders illustrated in FIG. 5 are shown as completely encircling and encompassing each auxiliary lens 184, it understood that various embodiments may exist wherein the entire lens may be encompassed and contained or only a portion of the lens may be contained within the lens holder 182 or no holder may be used at all and the auxiliary lens frame may simply include auxiliary lenses coupled together via a bridge.

At opposing ends of the auxiliary lens frame 180 are auxiliary frame extensions 186. Each of the auxiliary frame extensions preferably curve and bend to align with the temple extensions 14a–b of the eyewear platform 110. Each auxiliary frame extension 186 further comprises an auxiliary socket 188; with each auxiliary socket 188 positioned such that it will align with a corresponding socket 18 in the eyewear platform 110 when the auxiliary lens frame 180 is coupled to the eyewear platform 110. Each auxiliary socket 188 in the auxiliary lens frame 180 preferably houses a magnetic member 190.

As shown in FIG. 5, the auxiliary lens frame 180 is preferably designed to couple to the eyewear platform 110 from the bottom and the front. In this way the lenses in the auxiliary lens frame extend just in front of the both the primary lenses and the eyewear platform. The shape and size of the auxiliary lens frame 180 may vary depending upon shape and size of both the eyewear platform 110 and the primary lens frame 150. The material used to comprise the auxiliary lens frame 180 may be the same as or different from the material used to comprise the eyewear platform 110 and/or the primary lens frame 150.

Figure 6:
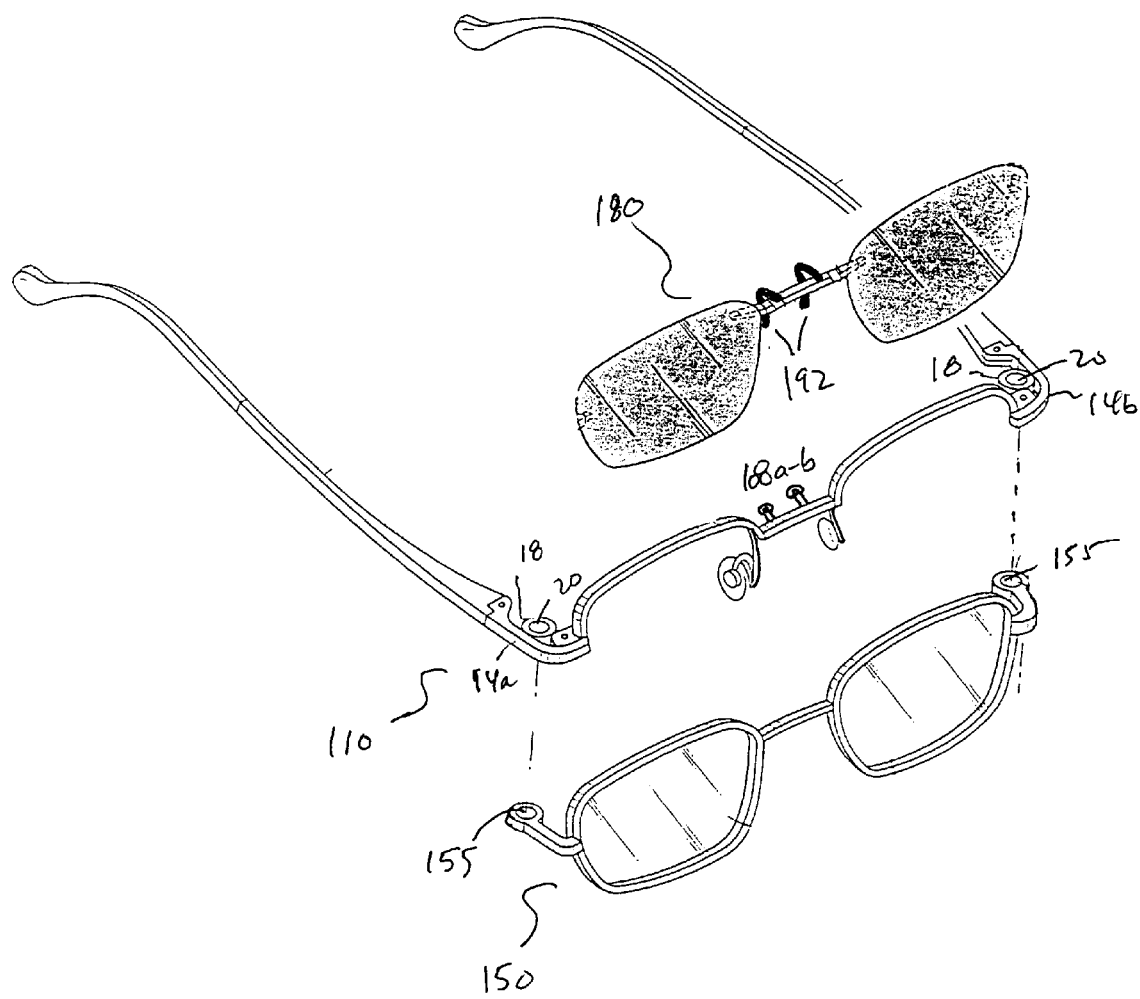
FIG. 6 shows an exploded view of an alternative embodiment of the invention where the primary lens frame couples to the eyewear platform from the bottom via magnetic members located near the temples and the auxiliary lens frame couples to the eyewear platform from the top via a pair of mated pin/sockets located near the bridge.

FIG. 6 shows an exploded view of an alternative embodiment of the invention where the primary lens frame 150 couples to the eyewear platform 110 from the bottom via magnetic members 155 located near the temples and the auxiliary lens frame 180 couples to the eyewear platform 110 from the top via a pair of mated pin/sockets located near the bridges of the auxiliary lens frame 180 and the eyewear platform 110.

While the invention as described in connection with its preferred embodiments, it will be understood that it is not intended to limit the invention to those embodiments. On the contrary, it is intended to cover all alternatives, modifications, and equivalents as may be included within the spirit and scope of the invention as defined by the appended claims.

What is claimed is:

1. Eyewear comprising:
    an eyewear platform having a bridge portion and a pair of temple extensions, each temple extension located at an opposite end of said bridge portion and having a socket extending therefrom with a magnetic member disposed within said socket;
    a primary lens frame having a pair of primary lenses and a pair of primary magnetic members, wherein each primary magnetic member magnetically couples to a corresponding magnetic member in one of the sockets of the eyewear platform from the top, thereby securing the primary lens frame to the eyewear platform; and
    an auxiliary lens frame having a pair auxiliary lenses and a pair of auxiliary magnetic members, wherein each auxiliary magnetic member magnetically couples to a corresponding magnetic member in one of the sockets of the eyewear platform from the bottom, thereby securing the auxiliary lens frame to the eyewear platform such that the auxiliary lenses are disposed in front of the primary lenses.

2. The eyewear of claim 1, wherein each magnetic member is recessed within its respective socket, thereby forming recesses at the tops of the sockets.

3. The eyewear of claim 2, wherein the primary magnetic members of the primary lens frame extend into the recesses formed at the tops of the sockets thereby magnetically coupling each of the primary magnetic members to a magnetic member in one of the sockets of the eyewear platform from the top and securing the primary lens frame to the eyewear platform.

4. The eyewear of claim 1, wherein each magnetic member is recessed within its respective socket, thereby forming recesses at the bottoms of the sockets.

5. The eyewear of claim 4, wherein the auxiliary magnetic members of the auxiliary lens frame extend into the recesses formed at the bottoms of the sockets thereby magnetically coupling each of the auxiliary magnetic members to a magnetic member in one of the sockets of the eyewear platform from the bottom and securing the auxiliary lens frame to the eyewear platform.

6. Eyewear comprising:
    an eyewear platform having a first pair of magnetic members;
    a primary lens frame having a pair of primary lenses and a pair of primary magnetic members, wherein the primary magnetic members magnetically couple to the first pair of magnetic members in the eyewear platform from the top, thereby securing the primary lens frame to the eyewear platform; and
    an auxiliary lens frame having a pair auxiliary lenses and a pair of auxiliary magnetic members, wherein the auxiliary magnetic members magnetically couple to the first pair of magnetic members in the eyewear platform from the bottom, thereby securing the auxiliary lens frame to the eyewear platform such that the auxiliary lenses are disposed in front of the primary lenses.

7. The eyewear of claim 6, wherein the eyewear platform further includes a bridge portion and a pair of temple extensions, each temple extension located at an opposite end of said bridge portion, each temple extension having a socket extending therefrom, the magnetic members being disposed within each of said sockets.

8. The eyewear of claim 7, wherein each magnetic member is recessed within its respective socket, thereby forming recesses at the tops of the sockets.

9. The eyewear of claim 8, wherein the primary magnetic members of the primary lens frame extend into the recesses formed at the tops of the sockets thereby magnetically coupling each of the primary magnetic members to a magnetic member in one of the sockets of the eyewear platform from the top and securing the primary lens frame to the eyewear platform.

10. Eyewear comprising:
    an eyewear platform having a first pair of magnetic members and a pair of mounting sockets;
    a primary lens frame having a pair of primary lenses and two separate pin extensions which extend forward and downward from the primary lens frame, each of said pin extensions designed to engage a corresponding mounting socket in the eyewear platform such that the primary lens frame couples with and mounts to the eyewear platform from the rear of the platform;
    an auxiliary lens frame having a pair auxiliary lenses and a pair of auxiliary magnetic members, wherein the auxiliary magnetic members magnetically couple to the first pair of magnetic members in the eyewear platform from the bottom, thereby securing the auxiliary lens frame to the eyewear platform such that the auxiliary lenses are disposed in front of the primary lenses.

11. The eyewear of claim 10, wherein the eyewear platform further includes a bridge portion and a pair of temple extensions, each temple extension located at an opposite end of said bridge portion, each temple extension having a socket extending therefrom, the first pair of magnetic members being disposed within each of said sockets.

12. The eyewear of claim 11, wherein each magnetic member in the first pair of magnetic members is recessed within its respective socket, thereby forming recesses at the bottoms of the sockets.

13. The eyewear of claim 12, wherein the auxiliary magnetic members of the auxiliary lens frame extend into the recesses formed at the bottoms of the sockets thereby magnetically coupling each of the auxiliary magnetic members to a corresponding magnetic member in the first pair of magnetic members of the eyewear platform from the bottom and securing the auxiliary lens frame to the eyewear platform.

* * * * *